US012775712B2

(12) United States Patent
Narayan et al.

(10) Patent No.: US 12,775,712 B2
(45) Date of Patent: Oct. 27, 2026

(54) MACHINE-LEARNING BASED POLICY TRANSLATION FOR SHIFT LEFT IaC SECURITY

(71) Applicant: Palo Alto Networks, Inc., Santa Clara, CA (US)

(72) Inventors: Krishnan Shankar Narayan, San Jose, CA (US); Srikumar Narayan Chari, Cupertino, CA (US); Vivek Hari Menon, Kochi (IN); Venkata Ramadurga Prasad Katakam, Sunnyvale, CA (US)

(73) Assignee: Santa Alto Networks, Inc., Santa Clara, CA (US)

( * ) Notice: Subject to any disclaimer, the term of this patent is extended or adjusted under 35 U.S.C. 154(b) by 269 days.

(21) Appl. No.: 18/442,428

(22) Filed: Feb. 15, 2024

(65) Prior Publication Data

US 2025/0265344 A1 Aug. 21, 2025

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS 7,127,700 B2 * 10/2006 Large .................... G06F 16/958 707/E17.116
2009/0070769 A1 * 3/2009 Kisel .................... G06F 9/5061 718/104
2015/0180885 A1 * 6/2015 Edery .................. H04L 63/168 726/1
2017/0228524 A1 * 8/2017 Hay ........................ G06F 21/12
2023/0214506 A1 * 7/2023 Narayan ............... G06F 21/604 726/1

* cited by examiner

*Primary Examiner* — Paul R Fisher
(74) *Attorney, Agent, or Firm* — Gilliam IP PLLC

(57) ABSTRACT

A shift left security policy translator "translates" runtime security policies into build-time security policies. The translating involves constructing build-time security policies based on runtime security policies at rule granularity. Natural language processing (NLP) is leveraged for the system to learn fields of build-time security policies and natural language descriptions of the fields. With a runtime security rule, the shift left security policy translator extracts fields of the runtime security rule and retrieves descriptions of the extracted fields from specifications. The shift left security policy translator then determines descriptions of build-time fields most similar to the descriptions of the extracted runtime fields. The shift left security policy translator constructs a build-time rule with build-time fields corresponding to the build-time field descriptions most similar to the extracted runtime field descriptions. The shift left security policy translator then predicts values for the build-time fields and evaluates validity of the predicted values.

20 Claims, 5 Drawing Sheets

MACHINE-LEARNING BASED POLICY TRANSLATION FOR SHIFT LEFT IaC SECURITY

BACKGROUND

The disclosure generally relates transmission of digital information (e.g., CPC class H04L) and arrangements for maintenance, administration, or management of networks (e.g., CPC subclass H04L 41).

Shift left testing generally refers to an approach of testing earlier in the software development lifecycle. This paradigm has also been used in the security context—shift left security. Shift left security moves security testing earlier into the software development lifecycle. Thus, security testing is shifted into and/or among plan, code, and build.

Infrastructure as code (IaC) is a methodology for managing data resources using configuration files. IaC has the capability of automatically mapping and deploying cloud resources based on user-defined configuration of resources as specified in configuration files. IaC tools such as the Terraform® IaC tool enable the automated process of mapping and deploying these resources by interpreting configuration files. IaC allows operations teams to work with developers earlier in the development cycle to promote best practices for both development and operations in tandem.

Natural language processing (NLP) is a field dedicated to the study of computer interpretation of natural languages. This can take the form of speech recognition, text classification, and text-to-speech translation, among other examples. For text classification, documents are parsed for string tokens and string tokens are converted to embedded numerical feature vectors. These embeddings that map parsed strings to numerical space preserve semantic similarity between strings in the resulting numerical space. Text documents with similar classifications and/or content may vary with respect to size and format. Bidirectional Encoder Representations from Transformers (BERT), which is based on the transformer deep learning model, is another technique for NLP that employs machine learning. The BERT model is a deep bidirectional model that is able to learn the context in which words appear. This is in contrast to other NLP tools that generate vector representations of text that are not contextual, such as doc2vec and word2vec, as BERT can produce contextualized embeddings.

SUMMARY

Brief Description of the Drawings

Embodiments of the disclosure may be better understood by referencing the accompanying drawings.

DESCRIPTION

Figure 1:
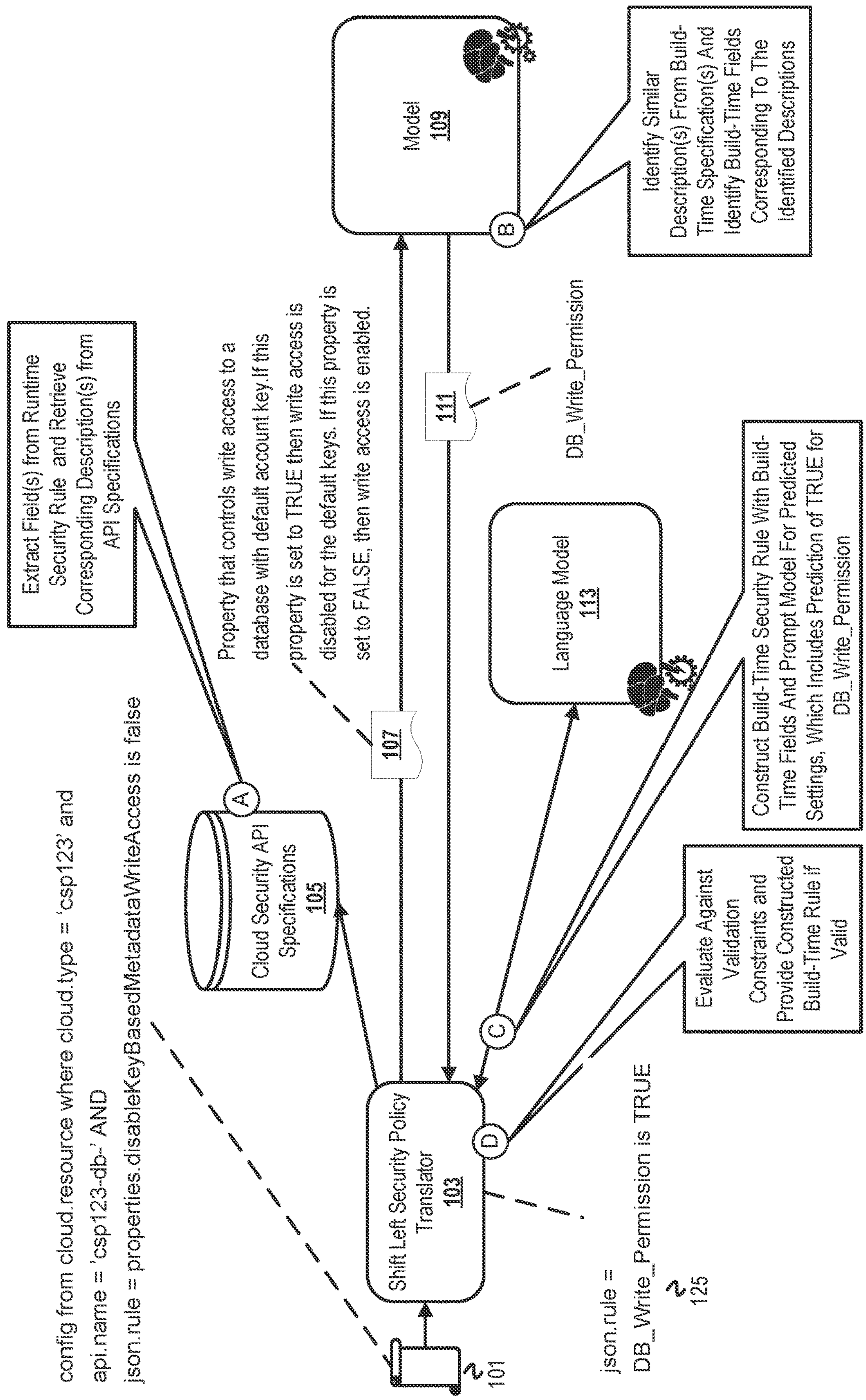
FIG. 1 is a diagram of a shift left security policy translator constructing a build-time security rule from a runtime security rule.

The description that follows includes example systems, methods, techniques, and program flows to aid in understanding the disclosure and not to limit claim scope. Well-known instruction instances, protocols, structures, and techniques have not been shown in detail for conciseness.

Terminology

An "IaC resource" refers to any resource managed by IaC via a configuration file/template. Resources can include program modules, program functions, physical memory, virtual machines, security policies, cloud resources, etc. The dependencies and scope of each resource are defined by a section of a template according to an application programming interface (API) for the corresponding IaC tool. Resources can be updated and monitored for best practices and security policy consistency using version control via the IaC tool.

The terms "runtime security policy" and "build-time security policy" refer to policies for evaluating cloud provisioning/managing code with respect to security concerns. These policies will specify a cloud resource(s) and one or more rules relating to security for the specified cloud-resource(s). A runtime security policy will include a security related rule(s) applied to the specified cloud resource(s) at runtime or in a runtime environment. For instance, the runtime security policy rule can be a rule for a resource query language (RQL) expressed as a JSON rule. The JSON rule can define a security policy rule for resources hosted by a cloud services platform (CSP)/cloud vendor, and an RQL engine can convert the RQL rule to queries according to the CSP API. A runtime security policy rule will be expressed with one or more runtime fields. A runtime field will be a function of API design and resource definitions provided by the CSP, likely to fulfill business objective of facilitating clients managing runtime workloads and extensibility. A build-time security policy will include a security related rule(s) applied to configuration/provisioning code of the specified cloud resource(s) at build-time. A build-time security policy rule will be expressed with one or more build-time fields. Build-time fields are a function of developer oriented commands/directives that are abstraction constructs, such as IaC, of runtime API calls or call sequences.—

This description uses shorthand terms related to cloud technology for efficiency and ease of explanation. When referring to a "cloud," this description is referring to the resources of a CSP. For instance, a cloud can encompass the servers, virtual machines, compute abstractions, and storage devices of a cloud service provider. In more general terms, a CSP resource accessible to customers is a resource owned or managed by the CSP entity that is accessible via network connections. Often, the access is in accordance with an API provided by the CSP.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Introduction

IaC provides idempotency and repeatability in managing and provisioning cloud resources. These qualities yield speed and relative simplicity in managing and provisioning cloud resources and produce stable environments, which drives the increasing adoption of IaC. Increasing adoption increases the importance of "IaC security." IaC security at least involves scanning IaC (i.e., scanning the code that manages and/or provisions a cloud resource(s)) to identify security issues which can include misconfigurations. The security issues arise from attributes or fields missing or having improper settings, such as missing or incorrect settings. The scanning is according to rules defined in policies. With most IaC being cloud-agnostic, the policies can number in the hundreds.

Overview

IaC security can be implemented with either or both of a preventative, build-time approach or a reactive, runtime approach. Most policies have been written according to the reactive, runtime approach. However, shift left for IaC security increases overall IaC security at least by reducing threat opportunities during runtime and being another check against drifting of the actual known state of a cloud configuration from a last defined configuration ("cloud drift"). Build-time IaC security requires build-time security policies.

A shift left security policy translator has been created that can efficiently leverage a relatively larger pool of runtime security policies created from extensive knowledge and experience to "translate" runtime security policies into build-time security policies. The translating involves constructing build-time security policies based on runtime security policies at rule granularity. NLP is leveraged for the system to learn field labels/attributes of build-time security policies and natural language descriptions of the field labels/attributes (hereinafter "fields" for simplicity). The system can continue learning based on updates to specifications and/or manuals. With a runtime security rule, the shift left security policy translator extracts fields of the runtime security rule and retrieves descriptions of the extracted fields from specifications. The shift left security policy translator then determines descriptions of build-time fields most similar to the descriptions of the extracted runtime fields. The shift left security policy translator constructs a build-time rule with build-time fields corresponding to the build-time field descriptions most similar to the extracted runtime field descriptions. The shift left security policy translator then predicts values for the build-time fields and evaluates validity of the predicted values.

Example Illustrations

FIG. 1 is a diagram of a shift left security policy translator constructing a build-time security rule from a runtime security rule. FIG. 1 depicts an example of translating a rule from a runtime security policy 101. In this illustration, a shift left security policy translator 103 uses a model 109 that is distinct from the shift left security policy translator 103 (hereinafter "translator"). The translator 103 could be implemented to include the model 109. Furthermore, this example illustration depicts an implementation that uses different models for determining build-time fields and for predicting field settings.

FIG. 1 is annotated with a series of letters A-D, each stage representing one or more operations. Although these stages are ordered for this example, the stages illustrate one example to aid in understanding this disclosure and should not be used to limit the claims. Subject matter falling within the scope of the claims can vary from what is illustrated.

At stage A, the translator 103 extracts each field from a runtime security rule and retrieves a corresponding description from an API specification(s). The runtime security rule is from the runtime security policy 101 for IaC security submitted to the translator 103. The runtime security policy 101 (or policy 101) may be explicitly indicated via an interface to the translator 103 or be a result of a policy query. For example, a user can submit to an interface a query with parameters for matching one or more runtime security policies to translate. The translator 103 can then process each rule of a matching runtime security policy. In FIG. 1, the runtime security policy is below.

config from cloud. resource where cloud.type='csp123' and api.name='csp123-db-' AND json.rule=properties.disableKeyBasedMetadataWriteAccess is false The translator 103 parses the policy 101 to identify the rule, in this case based on the keyword json.rule, and extracts the field properties.diable KeyBasedMetadataWriteAccess. The "extraction" does not remove the fields from the runtime security rule. The translator 103 searches API specification (s) 105 for descriptions of the fields. The API specifications 105 can include an API specification for any of a cloud provisioning tool, cloud configuration tool, a cloud services platform, etc. The API specification(s) may be stored locally relative to the translator 103 and/or remotely. This illustration will only refer to the description for the field properties.diableKeyBasedMetadataWriteAccess for a streamlined explanation of the technology, but a policy can have other rules and a rule can have multiple fields. From the cloud security API specification(s), the translator retrieves a description of the field properties.diable KeyBasedMetadataWriteAccess. The description for the field is "Property that controls write access to a database with default account key. If this property is set to TRUE then write access is disabled for the default keys. If this property is set to FALSE, then write access is enabled."

At stage B, the translator 103 creates an input 107 for the model 109 based on the retrieved description. The input 107 may be the description or function call that includes reference to the description. The model 109 is an embedding model (e.g., doc2vec, GloVe, or fasText) that generates contextual embeddings of natural language text. The model 109 has previously been used to create contextual embeddings of build-time field descriptions from specifications corresponding to build-time security policies. The contextual embeddings of build-time field descriptions are maintained in a database (not depicted) that preserves associations between contextual embeddings of the descriptions and the build-time fields organized to allow retrieval of the corresponding build-time field when a most similar embedding is found for a runtime field description embedding. The translator 103 uses the model 109 to generate an embedding for the runtime field description conveyed in the input 107. The translator 103 then determines a most similar description(s) as represented by build-time field description embeddings. For instance, the translator 103 can invoke a function to compute similarity measures (e.g., Euclidean distance, dot product, cosine similarity) of the embedding of input 107 and the previously created build-time field description embeddings. The translator 103 determines that the most similar embedding corresponds to the build-time field DB_Write_Permission as indicated with output 111 returned to the translator 103.

At stage C, the translator 103 constructs a build-time security rule 125. The translator 103 initially constructs the rule with the output 111 as a field to replace the field properties.diableKeyBasedMetadataWriteAccess. The translator 103 also determines a value or setting for the build-time field DB_Write_Permission. The translator 103 creates a prompt requesting the language model 113 to predict a setting for the field DB_Write_Permission based on an intent of a build-time security policy, which is preventative security (e.g., ensuring compliance with build-time security best practices or requirements). The translator 103 completes construction of the build-time rule 125 based on the predicted setting of TRUE returned by the language model 103. The language model 103 will have been trained (e.g., fine-tuned) with build-time security policies from select stores of build-time security policies.

At stage D, the translator 103 evaluates the constructed build-time rule against validation constraints. Validation constraints will indicate valid settings for fields based on data types, field, best practices, and/or customer preferences. This ensures a predicted setting from the language model 113 is valid. If successful, the translator 103 indicates the constructed build-time rule as valid. For example, the translator 103 presents the constructed build-time rule via a user interface or inserts the build-time rule into a build-time policy and stores it for deployment if complete.

Additional examples of translations are provided below to further aid in understanding the disclosed technology.

Example Runtime Security Policy 1

```
config from cloud.resource where cloud.type='csp123'
  AND api.name='csp123-ssm-parameter' AND
  json.rule='type does not contain SecureString'
```

Example Build-Time Security Policy 1

```
metadata:
  name: CSP123 SSM Parameter is not encrypted
  category: public
  guidelines: <text about policy>
  severity: high
scope:
  provider: csp123
definition:
  resource_types:
  aws_ssm_parameter
  cond_type: attribute
  operator: not_contains
  attribute: type
  value: SecureString
```

Example Runtime Security Policy 2

```
config from cloud.resource where cloud.type='csp123'
  AND api.name='csp123-rds-describe-db-instances'
  AND json.rule=(backupRetentionPeriod does not
  exist) or (backupRetentionPeriod less than 7)
```

Example Build-Time Security Policy 2

```
metadata:
  name: CSP123 RDS retention policy less than 7 days
  category: public
  guidelines: <text about policy>
  severity: high
scope:
  provider: csp123
definition:
  or:
  resource_types:
    123_db_instance
    cond_type: attribute
  operator: lesser than
  attribute: backup_retention_period
  value: '7'
  resource_types:
  csp123_db_instance
  cond_type: attribute
  operator: not_exists
  attribute: backup_retention_period
```

Example Runtime Security Policy 3

```
config from cloud.resource where cloud.type='csp123
  AND api.name=' csp123-ec2-describe-route-tables'
  AND json.rule=(routes [*].instanceld exists and routes
  [*].destinationCidrBlock contains "0.0.0.0/0")
```

Example Build-Time Security Policy 3

```
metadata:
  name: CSP123 NAT Gateways are not being utilized
    for the default route
  category: public
  guidelines: <text about policy>
  severity: high
scope:
  provider: csp123
definition:
  and:
  resource_types:
    csp123_route_table
    cond_type: attribute
    operator: contains
    attribute: routes [*].destinationCidrBlock
    value: 0.0.0.0/0
  resource_types:
    csp123_route_table
    cond_type: attribute
    operator: exists
    attribute: routes [*].instanceId
```

Figure 2:
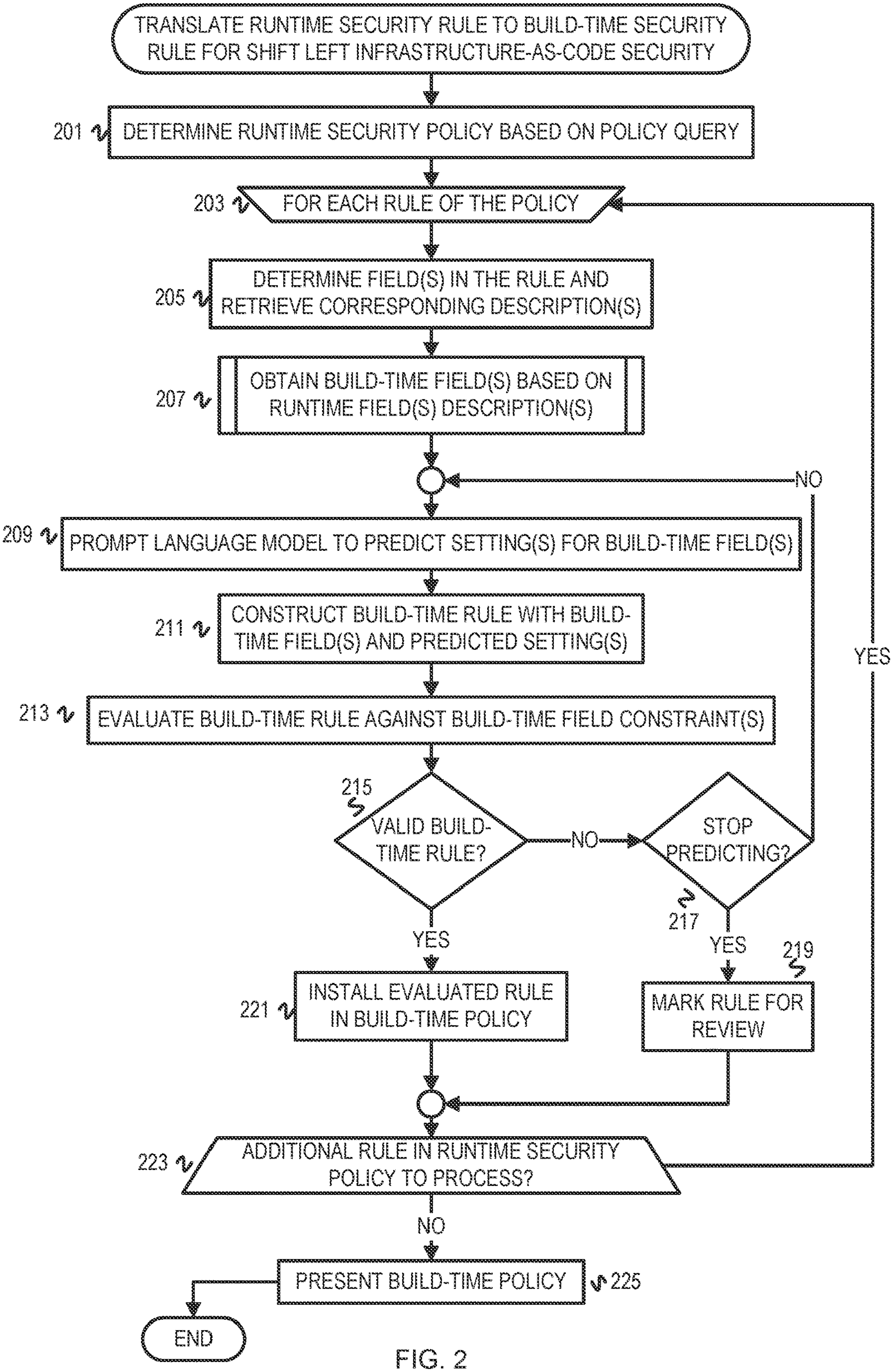
FIG. 2 is a flowchart of examples operations for translating a runtime security rule to a build-time security rule for shift left IaC security.

FIG. 2 is a flowchart of examples operations for translating a runtime security rule to a build-time security rule for shift left IaC security. The example operations are described with reference to a translator for consistency with FIG. 1 and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 201, the translator determines a runtime security policy based on a query. As mentioned in FIG. 1, a policy may be indicated as a result of a query on a store of runtime security policies. For instance, a query may be for any runtime security policy that affects a specified resource. If multiple policies are indicated, the example operations can repeat for each indicated policy.

At block 203, the translator begins processing each rule in the policy. The translator parses the policy, for example, according to language and format of the policy. The translator may also initialize a build-time security policy based on the runtime security policy. As an example, the translator may create a policy with the parameters of the runtime security policy that specify a cloud platform and resource(s)

of the cloud platform. As each build-time rule is constructed, the build-time rule is written into the build-time security policy.

At block 205, the translator determines each field in the rule and retrieves a corresponding description(s). The translator can determine each field based on token or keyword matching and/or rule formatting. The translator uses the field (i.e., field name or field label) to search API specifications corresponding to the cloud platform or cloud resource. For example, the translator can select one or more specifications based on the cloud resource parameters indicated in the policy. The translator can then search each of these specifications for the field and description of the field. The translator then retrieves the description.

Figure 3:
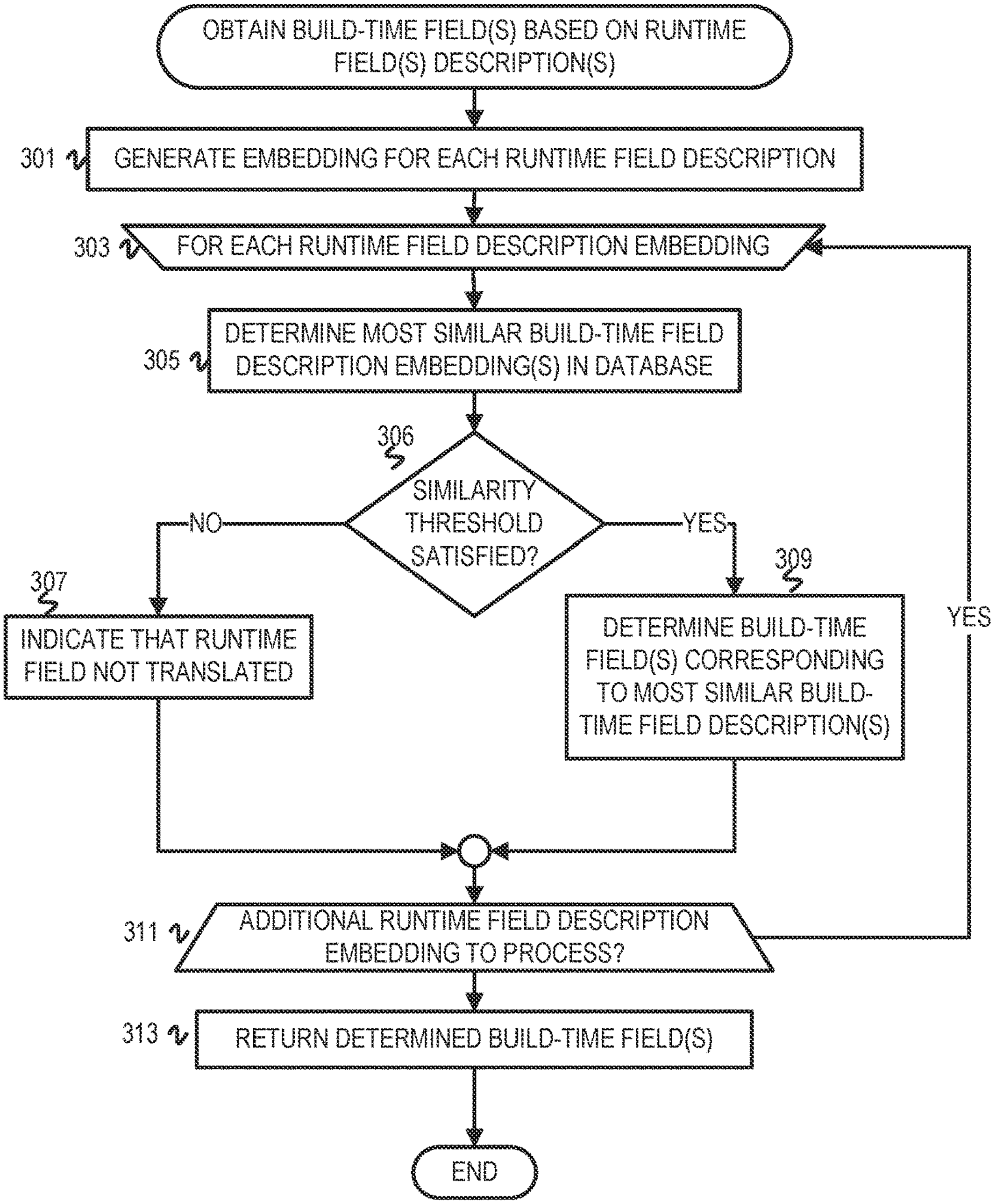
FIG. 3 is a flowchart of example operations for obtaining build-time field(s) based on runtime field(s) description(s).
Figure 4:
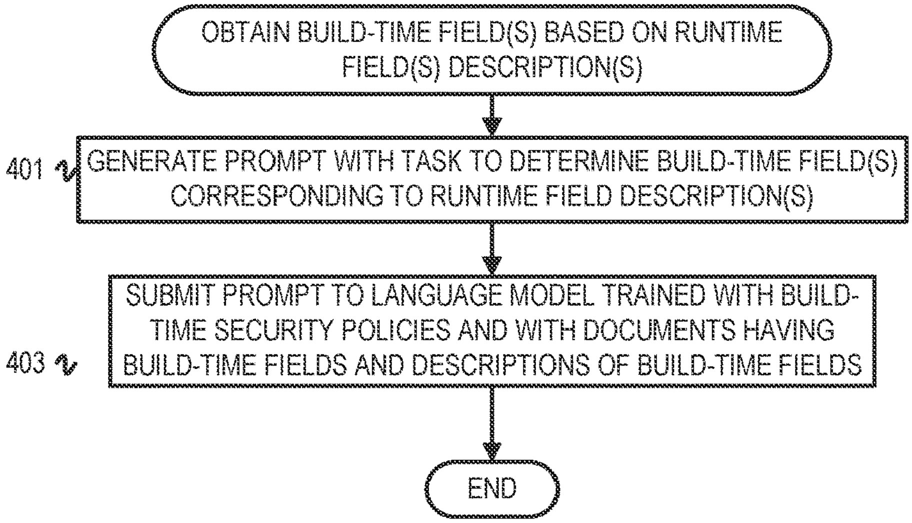
FIG. 4 is a flowchart of example operations for obtaining build-time field(s) based on runtime field(s) description(s).

At block 207, the translator obtains one or more build-time fields for each runtime field of the runtime security rule. The translator obtains the build-time field(s) based on the runtime field description that was retrieved. The translator can use a previously established embedding space to determine most similar embeddings or can use a natural language prompt to a language model. FIG. 3 is a flowchart with an example of using embeddings. FIG. 4 is flowchart with an example of using a natural language prompt to a language model. Each of these flowcharts will be described after FIG. 2.

At block 209, the translator prompts a language model to predict a setting(s) for the build-time field(s) that was obtained. The translator can use a prompt template that requests a setting or value be assigned to each obtained build-time field for a build-time security policy. The prompt can include an explicit indication that the intent of the build-time security policy is preventative or this can be implied by specifying that the setting is to be predicted for a build-time security rule. Moreover, the inclusion of multiple similar build-time fields can provide context and/or hints to the language model. In addition, the prompt can include hints to constrain predictions based on cloud vendor descriptions that specify allowed values of fields and/or the hints may have been learned by the language model from previously ingesting the cloud vendor descriptions.

At block 211, the translator constructs a build-time rule with the obtained build-time field(s) and predicted setting(s). The translator can maintain an association (e.g., mapping) between each runtime field and corresponding obtained build-time field and make substitutions while referring to the runtime security rule or editing a copied version of the runtime security rule. In addition, the translator can use a template for a build-time security policy to guide some of the construction. The template can specify a field(s) that occurs in a build-time rule based on the resource or rule type and is not dependent on a translation. This template or another can also guide construction of the build-time policy. For instance, the policy template can specify which values to extract from the runtime security policy and where to assign those values in a build-time security policy. Referring to the earlier build-time policy examples, a template can indicate the build-time fields category, guidelines, severity, and scope and indicate what settings to assign to these fields.

At block 213, the translator evaluates the build-time rule against build-time rule constraint(s). A set of rules will have been defined to ensure settings are valid. Some rules can be based on type setting, such as Boolean, while others can be based on the field itself. As an example of a combination of attributes encompassed by a rule, a rule may specify a subset of Boolean type fields that should have a setting that is the inverse of the corresponding runtime field.

At block 215, the translator determines whether the evaluation result indicates that the constructed build-time rule is valid. Implementations may also allow for a valid indication with a warning to suggest human evaluation before deployment. If the build-time rule is valid, then operational flow proceeds to block 221. Otherwise, operational flow proceeds to block 217.

At block 217, the translator determines whether to stop predicting settings for the build-time rule being constructed. Implementations can set a limit on the number of retries for predicting settings. This can be set based on a heuristic corresponding to observed likelihood of improvement in the prediction. If the translator is to continue predicting settings, then operational flow returns to block 209. Otherwise, operational flow proceeds to block 219.

At block 219, the translator marks the rule for review. While the build-time rule may have an invalid setting, efficiency can still be gained from reviewing and correcting a rule instead of writing the rule entirely. Data can be stored to indicate in a user interface that the build-time rule requires review and/or the field(s) with invalid setting(s) requires review.

If the build-time rule was determined to be valid at block 215, then the translator installs the evaluated build-time rule in the build-time policy at block 221. This assumes an implementation in which the rule is being constructed outside of the policy and is then written into the policy. An implementation can construct the rule within the build-time security policy.

At block 223, the translator determines whether there is an additional rule in the runtime security policy to process. If there is an additional runtime security rule to process, then operational flow returns to block 203. Otherwise, operational proceeds to block 225.

At block 225, the translator presents the build-time security policy that has been created or "translated" from the runtime security policy. For instance, the translator updates a user interface to indicate the build-time security policy or writes the build-time security policy to a store of policies.

FIG. 3 is a flowchart of example operations for obtaining build-time field(s) based on runtime field(s) description(s). This example obtains build-time fields based on an embedding model that has already established an embedding space. The embedding model has already generated vectors or embeddings for descriptions of build-time fields extracted from specifications corresponding to build-time security policies. In addition, the embeddings of the build-time field descriptions are stored in a database in association with the build-time fields.

At block 301, the translator generates an embedding for each runtime field description. The translator invokes the embedding model for each runtime field description.

At block 303, the translator begins processing each runtime field description embedding. Assuming multiple runtime field description embeddings, the translator can iterate through a list or array of the runtime field description embeddings that have been generated for fields of a runtime security rule.

At block 305, the translator determines a most similar build-time field description embedding(s). For instance, the build-time embedding descriptions may be stored in a vector similarity database. The translator searches the vector similarity database for entries most similar to the runtime field description embedding. The translator can be implemented to select embeddings with a similarity measurement above a high similarity threshold or within a margin of the embedding with a highest similarity measurement. Thus, the translator may determine that multiple build-time field description embeddings are most or highly similar to a runtime field description embedding.

At block 306, the translator determines whether the similarity measurement between the most similar build-time field description embedding(s) and the runtime field description embedding satisfies a minimum similarity threshold. An implementation can define the threshold to only accept as similar those that satisfy this threshold to avoid a most similar embedding that is not actually semantically similar. If the similarity threshold is not satisfied, operational flow proceeds to block 307. If the similarity threshold is satisfied, then operational flow proceeds to block 309. Implementations that use the threshold or margin for determining highly similar embeddings (block 305) may use that threshold or margin also as the minimum similarity measurement. This means that if a build-time description embedding satisfies the high similarity criterion (e.g., high similarity margin or threshold), then a minimum similarity has implicitly been satisfied. For a different example, an implementation may use both a high similarity margin and a minimum similarity threshold. For instance, a build-time description embedding may have a similarity measurement within a defined margin of the build-time description embedding with the highest similarity measurement but does not satisfy the minimum similarity threshold.

At block 307, the translator indicates that the runtime field is not translated. For example, metadata can be set to indicate the lack of a build-time translation for the field to be used by a user interface engine or encoded into the rule. Operational flow proceeds to block 311.

At block 309, the translator determines a build-time field corresponding to the most similar build-time field description. An implementation can use a vector similarity database to facilitate efficient searching of the build-time embeddings and a different database to maintain mappings or associations between build-time field description embeddings and build-time fields. The translator searches the embedding-to-field mappings to determine the build-time field corresponding to the most similar embedding. Operational flow proceeds to block 311.

At block 311, the translator determines whether there is an additional runtime field description embedding to process. If so, operational flow returns to block 303. Otherwise, operational flow proceeds to block 313.

At block 313, the translator returns the determined build-time field(s). If no translation was found for a runtime field description, then the translator returns an indication (e.g., tag, reserved field, etc.) indicating that a build-time field was not found for the runtime field description.

FIG. 4 is a flowchart of example operations for obtaining build-time field(s) based on runtime field(s) description(s). As previously mentioned, a language model (e.g., a large language model) will have been trained/fine-tuned with build-time security specifications, allowing the language model to learn the build-time security vocabulary corresponding to IaC platforms or tools.

At block 401, the translator generates a prompt for a language model. The prompt indicates a task for the language model to determine build-time field(s) corresponding to runtime field description(s) indicated in the prompt. This examples presumes a single prompt is created even in the case of a runtime security rule containing multiple fields. Implementations can instead create prompt per runtime field description.

At block 403, the translator submits the prompt to the language model. The translator will then extract the translated build-time field(s) from the language model response.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations of FIG. 2 corresponding to retrying prediction may not be performed in implementations that limit to a single prediction attempt per rule. In addition, embodiments may partially construct the rules of a policy and submit a single prompt to a language model requesting predictions of the settings for the fields of the rules. This may be done to conserve resources (i.e., fewer language model prompts) and/or to use the set of rules of a policy for context. In addition, the prompt to the language model to predict field settings/values can include the policy parameters specifying a cloud resource(s) to also provide context. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
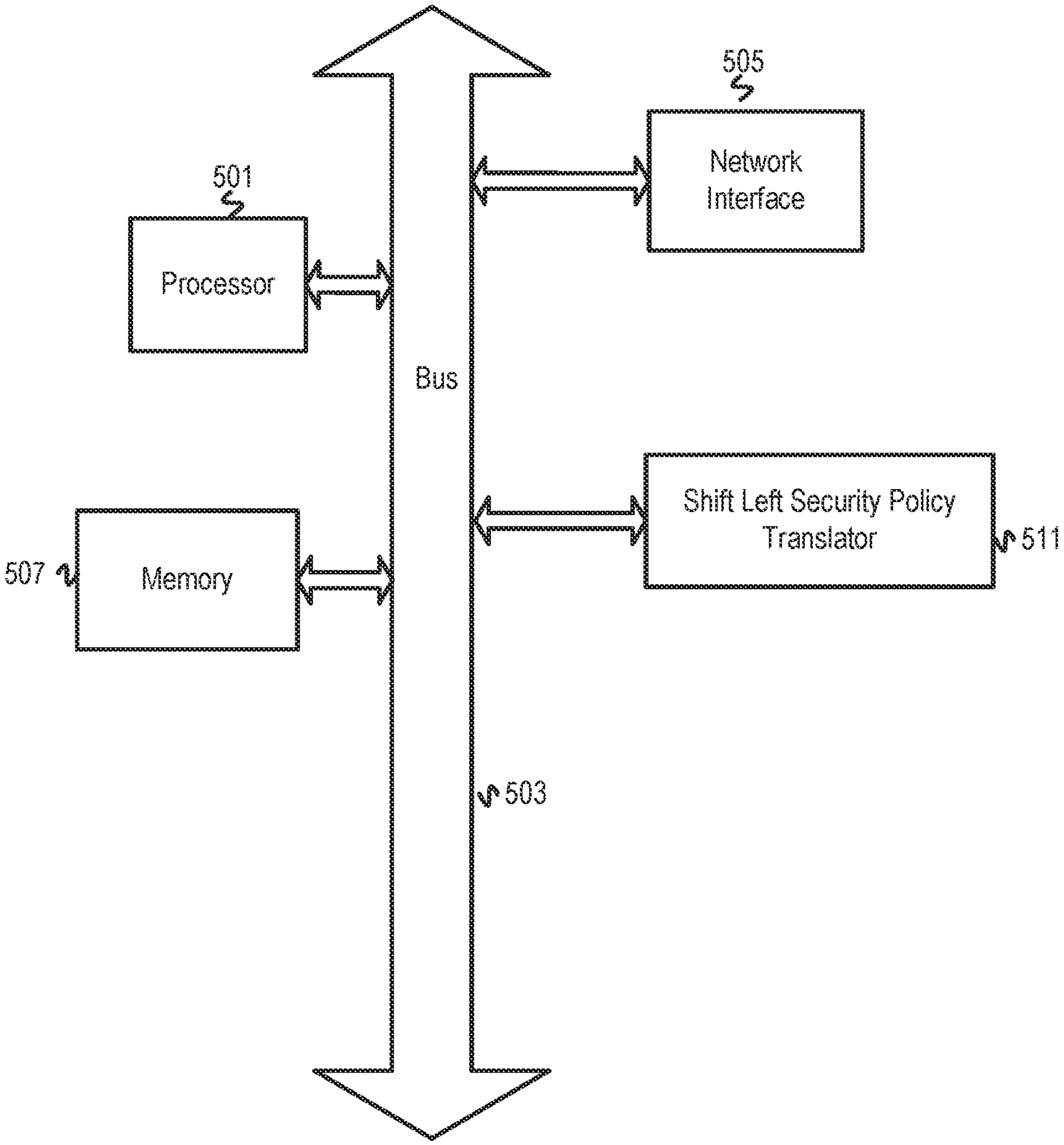
FIG. 5 depicts an example computer system with a shift left security policy translator.

FIG. 5 depicts an example computer system with a shift left security policy translator. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes a shift left security policy translator 511. The shift left security policy translator 511 translates a runtime security policy into a build-time security policy for shift left IaC security by constructing a build-time rule for each runtime rule. The shift left security policy translator 511 uses specification descriptions of fields in a rule to determine build-time fields having similar descriptions. The shift left security policy translator 511 then uses a language model to predict settings for the build-time fields. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

The invention claimed is:

1. A method comprising:

determining a first set of one or more attributes of a runtime security rule;

for each of the first set of attributes, retrieving a description of the attribute from an application programming interface (API) specification;

determining a second set of one or more attributes based on the descriptions of the first set of attributes; and translating the runtime security rule into a build-time security rule using the second set of attributes, wherein the translating comprises obtaining for at least a subset of the second set of attributes a value to assign the attribute from a language model based, at least in part, on intent of the build-time security rule.

2. The method of claim 1 further comprising evaluating each value obtained from the language model based on a set of one or more constraints defined based on type of the attribute to which the value is to be assigned.

3. The method of claim 1, wherein translating the runtime security rule into the build-time security rule comprises partially constructing the build-time security rule using the second set of attributes and prompting the language model to complete the build-time security rule based on build-time intent or prompting the language model to predict for each of the subset of the second set of attributes.

4. The method of claim 1, wherein determining the second set of attributes comprises:

for each of the runtime security rule attribute descriptions of the first set of attributes, generating an embedding from the runtime security rule attribute description with an embedding model, wherein the embedding model was used to generate a plurality of embeddings for descriptions of attributes for build-time security rules;

determining which of the plurality of embeddings is most similar to the embedding for the runtime security rule attribute description; and determining the build-time security rule attribute corresponding to the most similar of the plurality of embeddings as one of the second set of attributes.

5. The method of claim 4 further comprising maintaining a database of embeddings of build-time security rule attribute descriptions in association with build-time security rule attributes, wherein the database includes the plurality of embeddings.

6. The method of claim 1, wherein determining the second set of attributes comprises prompting the language model or a different language model for build-time security rule attributes corresponding to the descriptions of the first set of attributes, wherein the prompted language model was fine-tuned with build-time security policies and application programming interface specifications corresponding to build-time security policies.

7. The method of claim 1 further comprising translating each runtime security rule in an identified runtime security policy, wherein translating each runtime security rule in the identified runtime security policy includes the translating the runtime security rule into the build-time security rule.

8. The method of claim 7 further comprising identifying the runtime security policy in response to a query on runtime security policies.

9. The method of claim 1, wherein the API specification is a cloud service provider API specification and the runtime security rule corresponds to a resource of the cloud service provider.

10. A non-transitory, machine-readable medium having program code stored thereon, the program code comprising instructions to:

determine runtime fields in a runtime security rule;

for each of the runtime fields, retrieve a description of the runtime field from one or more application programming interface (API) specifications;

generate vectors from the descriptions of the runtime fields;

for each runtime field description vector, determine a most similar build-time field description vector in a database of build-time field description vectors;

construct, at least partially, a build-time security rule with build-time fields corresponding to the build-time field description vectors most similar to the runtime field description vectors;

predict, for each of at least a subset of the build-time fields, a value for the build-time field; and assign the predicted values to respective ones of the subset of the build-time fields in the build-time security rule.

11. The non-transitory, machine-readable medium of claim 10, wherein the program code further comprises instructions to evaluate each predicted value based on a set of one or more constraints defined based on type of the build-time field to which the value is to be assigned.

12. The non-transitory, machine-readable medium of claim 10, wherein the program code further comprises instructions to prompt a language model to complete construction of the build-time security rule based, at least partly, on build-time intent.

13. The non-transitory, machine-readable medium of claim 10, wherein the instructions to predict, for each of at least a subset of the build-time fields, a value for the build-time field comprise instructions to prompt a language model to predict the value for the build-time field.

14. The non-transitory, machine-readable medium of claim 10, wherein the instructions to generate the vectors from the descriptions of the runtime fields comprise instructions to generate the vectors with an embedding model that was used to generate the build-time field description vectors.

15. The non-transitory, machine-readable medium of claim 10, wherein the program code further comprises instructions to crawl a plurality of websites with application programming interface (API) documentation corresponding to build-time security policies.

16. The non-transitory, machine-readable medium of claim 10, wherein the one or more API specifications includes a cloud service provider API specification and the runtime security rule corresponds to a resource of the cloud service provider.

17. An apparatus comprising:

a processor; and a machine-readable medium having instructions stored thereon, which when executed by the processor cause the apparatus to, determine runtime fields in a runtime security rule;

for each of the runtime fields, retrieve a description of the runtime field from one or more application programming interface (API) specifications;

generate vectors from the descriptions of the runtime fields;

for each runtime field description vector, determine a most similar build-time field description vector in a database of build-time field description vectors;

construct, at least partially, a build-time security rule with build-time fields corresponding to the build-time field description vectors most similar to the runtime field description vectors;

predict, for each of at least a subset of the build-time fields, a value for the build-time field; and assign the predicted values to respective ones of the subset of the build-time fields in the build-time security rule.

18. The apparatus of claim 17, wherein the machine-readable medium further has stored thereon instructions executable by the processor to cause the apparatus to evaluate each predicted value based on a set of one or more constraints defined based on type of the build-time field to which the value is to be assigned.

19. The apparatus of claim 17, wherein the machine-readable medium further has stored thereon instructions executable by the processor to cause the apparatus to prompt a language model to complete construction of the build-time security rule based, at least partly, on build-time intent.

20. The apparatus of claim 17, wherein the instructions to generate the vectors from the descriptions of the runtime fields comprise instructions executable by the processor to cause the apparatus to generate the vectors with an embedding model that was used to generate the build-time field description vectors.

* * * * *